(12) United States Patent
Fujita

(10) Patent No.: US 12,372,095 B2
(45) Date of Patent: Jul. 29, 2025

(54) CENTRIFUGAL BLOWER

(71) Applicant: MINEBEA MITSUMI Inc., Nagano (JP)

(72) Inventor: Kazuhiko Fujita, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/260,651

(22) PCT Filed: Feb. 18, 2022

(86) PCT No.: PCT/JP2022/006569
§ 371 (c)(1),
(2) Date: Jul. 7, 2023

(87) PCT Pub. No.: WO2022/196243
PCT Pub. Date: Sep. 22, 2022

(65) Prior Publication Data
US 2024/0060498 A1 Feb. 22, 2024

(30) Foreign Application Priority Data
Mar. 18, 2021 (JP) .................................. 2021-044393

(51) Int. Cl.
*F04D 25/06* (2006.01)
*F04D 17/10* (2006.01)
(Continued)

(52) U.S. Cl.
CPC ............. *F04D 25/06* (2013.01); *F04D 17/10* (2013.01); *F04D 29/4206* (2013.01); *H02K 5/15* (2013.01);
(Continued)

(58) Field of Classification Search
USPC ...................................................... 417/423.7
See application file for complete search history.

(56) References Cited

U.S. PATENT DOCUMENTS 7,497,742 B2 * 3/2009 Spinnato ............... H01R 13/111
439/851
10,527,302 B2 * 1/2020 Giangrande ............ F04D 25/08
(Continued)

FOREIGN PATENT DOCUMENTS

JP H04-317534 A 11/1992
JP 2003-230257 A 8/2003
(Continued)

OTHER PUBLICATIONS

International Search Report for corresponding International Application No. PCT/JP2022/006569 mailed Apr. 26, 2022.
(Continued)

*Primary Examiner* — Dominick L Plakkoottam
*Assistant Examiner* — Geoffrey S Lee
(74) *Attorney, Agent, or Firm* — Chrisman Gallo Tochtrop LPC

(57) ABSTRACT

The centrifugal blower includes an impeller, a motor for rotating the impeller, and a circuit board for driving and controlling the motor, the impeller, the motor, and the circuit board being accommodated in the centrifugal blower, at the inner side of a lower casing. The motor is arranged at a first end portion side in the shaft direction of the circuit board, an end cap is provided at the second end portion side in the shaft direction of the circuit board. The end cap is provided with an inner annular portion extending in the shaft direction and a pocket portion protruding inward in a radial direction from an inner circumferential surface of the inner annular portion. The motor is a three-phase brushless motor, and includes a common line coupling portion with three-phase coils wound around in a star connection. The common line coupling portion protrudes from the circuit board toward the second end portion side in the shaft direction to be accommodated in the pocket portion of the end cap.

8 Claims, 8 Drawing Sheets

(51) Int. Cl.
    *F04D 29/42*          (2006.01)
    *H02K 5/15*           (2006.01)
    *H02K 5/22*           (2006.01)
    *H02K 11/33*         (2016.01)
    *H02K 21/16*         (2006.01)

(52) U.S. Cl.
    CPC ............. *H02K 5/225* (2013.01); *H02K 11/33* (2016.01); *H02K 21/16* (2013.01); *H02K 2211/03* (2013.01)

(56) References Cited

U.S. PATENT DOCUMENTS

| | | | | |
|---|---|---|---|---|
| 2017/0331342 | A1* | 11/2017 | Beetz | H01R 4/2429 |
| 2018/0066665 | A1* | 3/2018 | Gu | F04D 25/0646 |
| 2018/0159402 | A1* | 6/2018 | Lee | H02K 1/28 |
| 2019/0003485 | A1* | 1/2019 | Nogamida | F04D 25/0606 |
| 2019/0273422 | A1* | 9/2019 | Kim | H02K 3/50 |
| 2019/0334393 | A1 | 10/2019 | Kim et al. | |
| 2020/0021160 | A1* | 1/2020 | Kuratani | H02K 5/08 |
| 2020/0313503 | A1* | 10/2020 | Hattori | H02K 11/30 |
| 2020/0333028 | A1* | 10/2020 | Patel | F04D 29/059 |
| 2021/0095679 | A1* | 4/2021 | Uchino | F04D 25/08 |
| 2022/0381248 | A1* | 12/2022 | Yamamoto | H02K 7/14 |

FOREIGN PATENT DOCUMENTS

| | | |
|---|---|---|
| JP | 2014-090572 A | 5/2014 |
| JP | 2016-135076 A | 7/2016 |
| JP | 2018-200048 A | 12/2018 |
| JP | 2020-016152 A | 1/2020 |

OTHER PUBLICATIONS

Written Opinion for corresponding International Application No. PCT/JP2022/006569 mailed Apr. 26, 2022.

English translation of Written Opinion for corresponding International Application No. PCT/JP2022/006569 dated Apr. 26, 2022.

* cited by examiner

CENTRIFUGAL BLOWER

CROSS-REFERENCE TO RELATED APPLICATIONS

This application is a national stage entry of International Application No. PCT/JP2022/006569 filed on Feb. 18, 2022, which claims the benefit of priority to Japanese Application No. JP2021-044393, filed Mar. 18, 2021, the entire disclosures of which are hereby incorporated herein by reference.

TECHNICAL FIELD

The disclosure relates to a centrifugal blower allowing easy insulation of a common line coupling portion in a motor for rotating an impeller.

BACKGROUND

Centrifugal blowers are widely used for air blowing, ventilation, cooling, and the like in household electrical appliances, office automation equipment, and air conditioning apparatuses for industrial use and vehicles (see, for example, JP 2020-016152 A). As illustrated in FIG. 10, a centrifugal blower disclosed in JP 2020-016152 A includes a casing 10, and the casing 10 accommodates an impeller 20 including a plurality of vanes 21 and a motor 30 for rotating the impeller 20.

A three-phase brushless motor may be used as the motor 30. A delta connection system and a star connection (Y connection) system are known as systems for coil connection for a brushless motor, and when U-phase, V-phase, and W-phase coils in the three-phase brushless motor are in the star connection, the coils are connected by a common line being a neutral point. The common line needs to be insulated from other members.

While the common line is generally insulated from other members with a coupling portion of the common line covered with an insulating tube, JP H4-317534 A proposes a system not using the insulating tube for example. FIG. 11 and FIG. 12 illustrates a brushless motor having such a common line coupling portion. A common line coupling portion fixing groove 6D is formed at an insulating wall portion 6C formed integrally with an insulating cover 2B, and a common line coupling portion 4 is pressed into the common line coupling portion fixing groove 6D to be fixed.

SUMMARY

However, when the brushless motor described in JP H4-317534 A is applied as a motor of the centrifugal blower described in JP 2020-016152 A, an operation of bending the common line coupling portion 4 a plurality of times needs to be performed in order to push the common line coupling portion 4 into the common line coupling portion fixing groove 6D. When the common line coupling portion 4 is insufficiently pushed into the common line coupling portion fixing groove 6D, the common line coupling portion 4 may jump out in the shaft direction from the common line coupling portion fixing groove 6D, and thus may fail to be insulated from other members.

The disclosure has been made in view of the above circumstance, and an object of the disclosure is to provide a centrifugal blower not requiring the common line coupling portion in the motor for rotating the impeller to be covered with an insulating tube in the first place, and also allows easy insulation of the common line coupling portion from other members and also allows the insulated state of the common line coupling portion to be reliably maintained.

The disclosure is a centrifugal blower including, at inner side of a casing, an impeller, a motor configured to rotate the impeller, and a circuit board carrying a circuit configured to drive and control the motor, the impeller, the motor, and the circuit board being accommodated in the centrifugal blower, wherein the motor is disposed at a first end portion side of the circuit board in a shaft direction, and an end cap is provided at a second end portion side of the circuit board in the shaft direction, the end cap includes an annular portion extending in the shaft direction and a tubular portion protruding inward in a radial direction from an inner circumferential surface of the annular portion, the motor is a three-phase brushless motor including a stator, and includes a common line coupling portion with three-phase coils wound around the stator in star connection, and the common line coupling portion protrudes toward the second end portion side in the shaft direction from the circuit board, and is accommodated in the tubular portion of the end cap.

According to the disclosure, since the common line coupling portion protrudes from the circuit board toward the second end portion side in the shaft direction to be accommodated in the tubular portion of the end cap, the common line coupling portion can be insulated from other members only by inserting the common line coupling portion into the tubular portion, whereby workability can be improved. Therefore, the common line coupling portion can be easily insulated from other members. Since the periphery of the common line coupling portion is surrounded by the tubular portion, the insulated state can be reliably maintained.

Here, the tubular portion can be in any orientation, but preferably extends in the shaft direction. In such an aspect, the common line coupling portion led out from the coil can be moved in the shaft direction relative to the tubular portion and inserted into the tubular portion without being bent, whereby workability can be further improved.

The casing includes an upper casing and a lower casing, and the end cap can be attached to the lower casing. In this case, a flange portion protruding outward in the radial direction is formed at an edge portion of the end cap, and a boss portion of the lower casing can be passed through a through hole formed at the flange portion and fixed by caulking.

The disclosure provides a centrifugal blower not requiring a common line coupling portion covered with an insulating tube in a motor for rotating an impeller in the first place, and also allows easy insulation of a common line coupling portion from other members and allows the insulated state of the common line to be reliably maintained.

DESCRIPTION OF EMBODIMENTS

1. Configuration of Centrifugal Blower

Figure 1A:
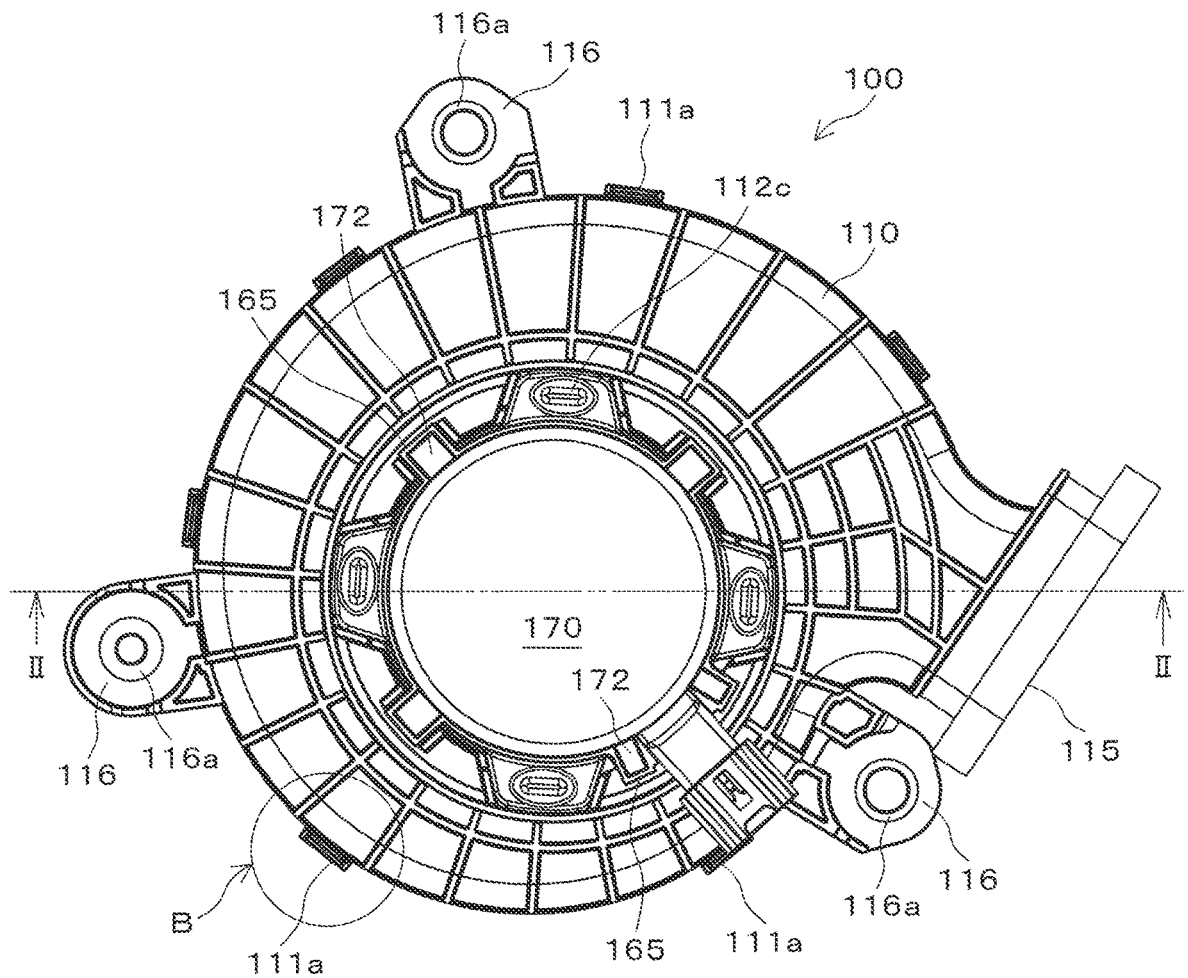
FIG. 1A is a back view of a centrifugal blower of an embodiment of the disclosure.
Figure 2:
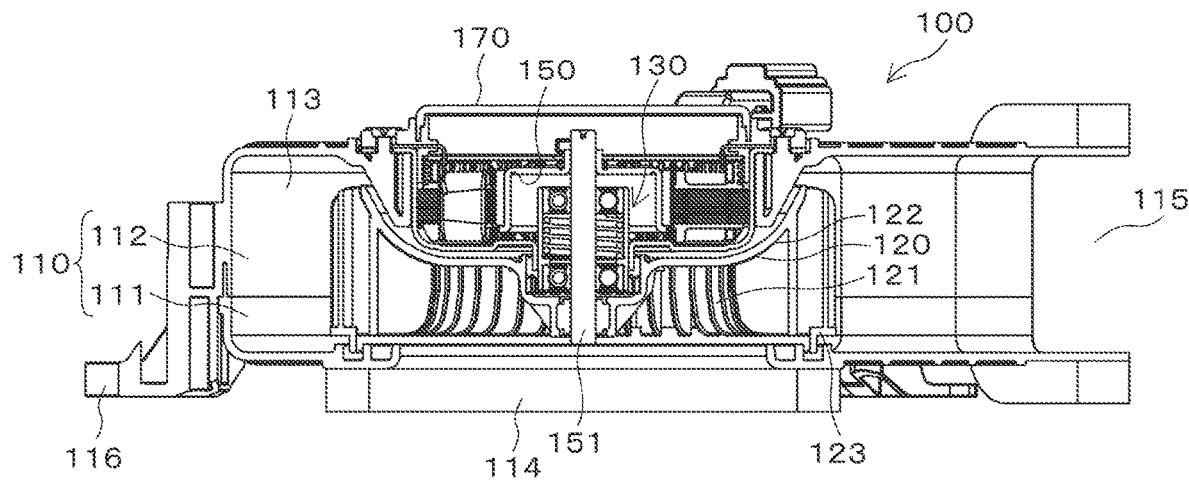
FIG. 2 is a cross-sectional view taken along line II-II in FIG. 1A.
Figure 3:
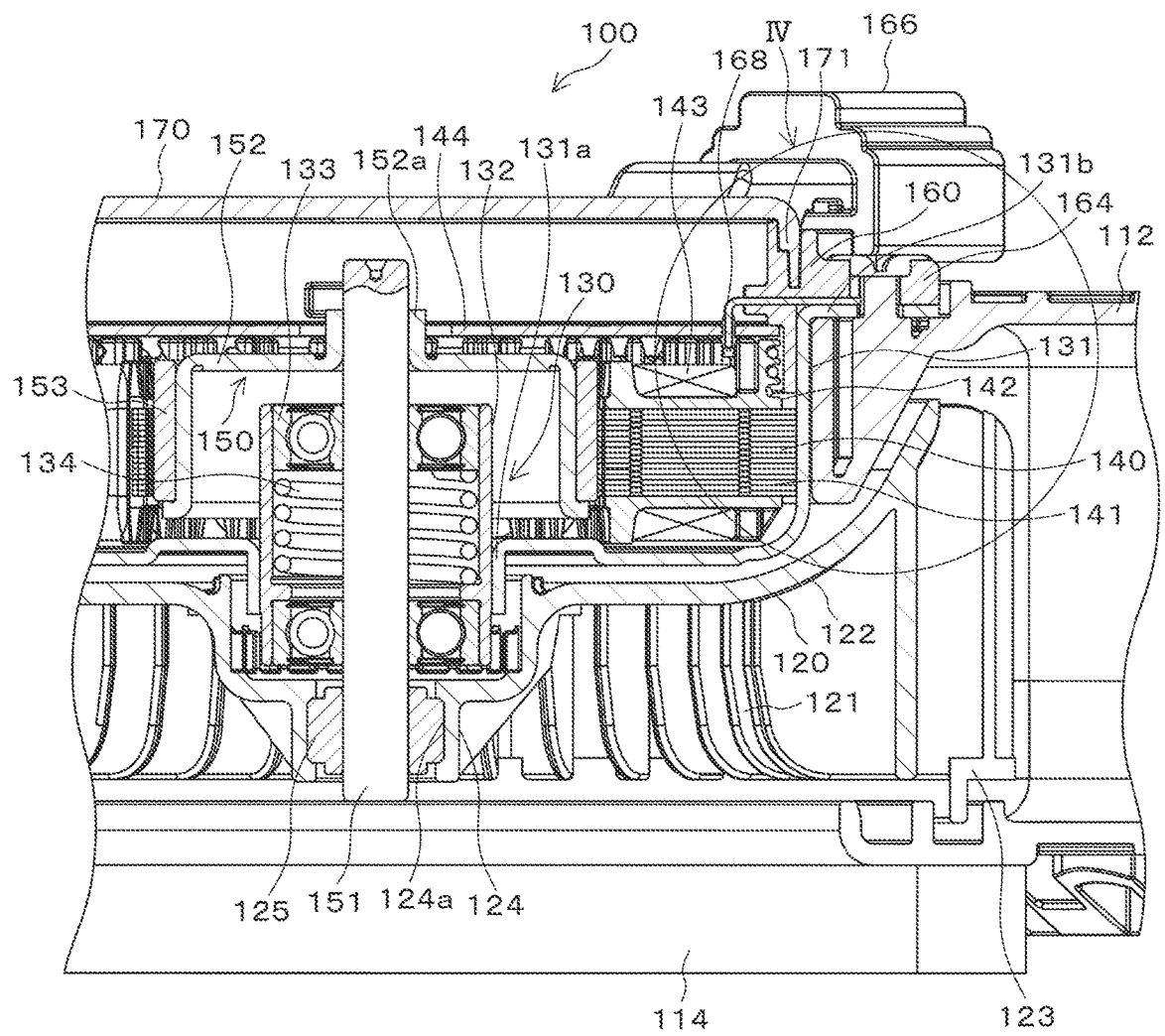
FIG. 3 is an enlarged view of a main part in FIG. 2.

FIG. 1A is a back view of a centrifugal blower 100 according to a first embodiment, FIG. 2 is a cross-sectional view taken along line II-II in FIG. 1A, and FIG. 3 is an enlarged view of a main part in FIG. 2. The centrifugal blower 100 includes: an impeller 120 including a plurality of vanes 121 being arranged in an inner side space at a shaft center side and an annular portion around the inner side space and rotating to discharge air in a centrifugal direction from the inner side space through a gap between the plurality of vanes 121; a spiral shape casing 110 accommodating, at the inner side, the impeller 120 in a rotatable state; and a suction port 114 being an opening provided at a position facing the inner side space of the impeller 120 and guiding air to the inner side space of the impeller 120.

Figure 1B:
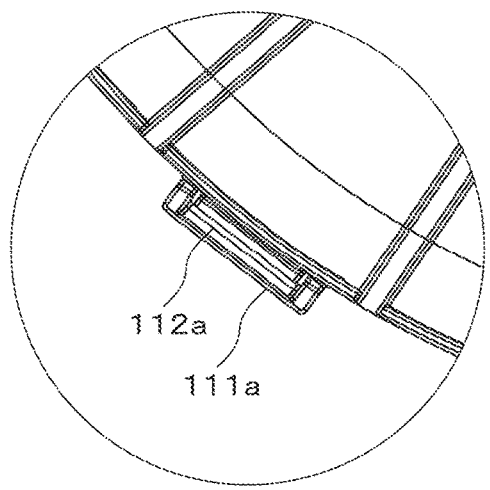
FIG. 1B is an enlarged view of a portion indicated by an arrow B in FIG. 1A.
Figure 5:
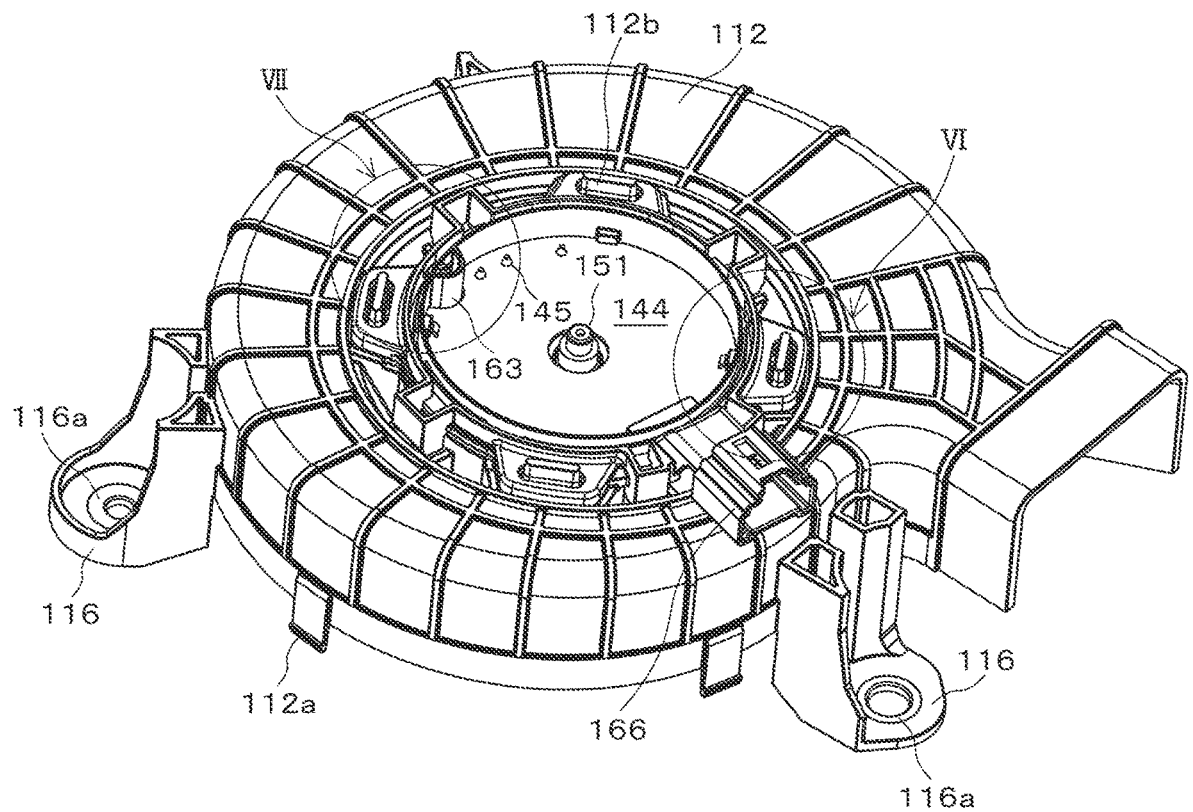
FIG. 5 is a perspective view illustrating a lower casing according to the embodiment.
Figure 6:
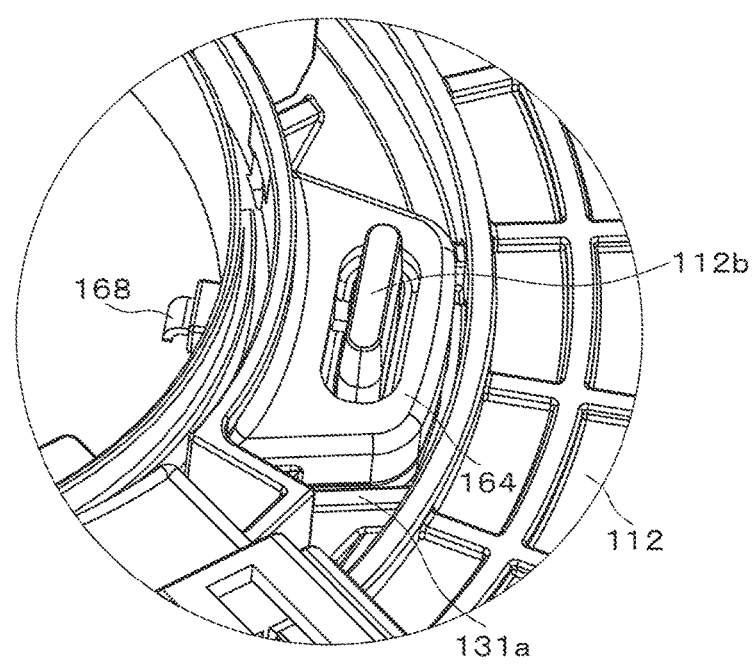
FIG. 6 is an enlarged view of a part indicated by an arrow VI in FIG. 5.

The centrifugal blower 100 includes the casing 110. As illustrated in FIG. 2, the casing 110 includes an upper casing 111 formed of resin and a lower casing 112 formed of resin. As illustrated in FIG. 5, claw portions 112a protruding outward in a radial direction are formed at an equal interval in a circumferential direction, at a lower edge portion of an outer circumference of the lower casing 112. On the other hand, as illustrated in FIGS. 1A and 1B, rectangular frame-shaped engaging portions 111a are formed at the outer circumference of the upper casing 111. The upper casing 111 and the lower casing 112 are coupled to each other, with the claw portion 112a inserted into and engaged with the engaging portions 111a. As illustrated in FIG. 2, the impeller 120 including the plurality of vanes 121 is rotatably accommodated inside the casing 110.

FIG. 2 and FIG. 3 are illustrated upside down because the main components are included in the lower casing 112 in the present embodiment. Therefore, in the following description, terms indicating directions such as "upper" and "lower" are used to indicate directions in FIG. 2 and FIG. 3.

A spiral shape flow path 113 (see FIG. 2) is formed at the inside of the casing 110. The flow path 113 is structured to have a starting end at a portion with the smallest gap between the impeller 120 and the casing 110 and to have a cross-sectional area gradually increasing from the starting end in a clockwise circumferential direction. A discharge port 115 is formed at a terminal end of the flow path 113. Thus, the spiral shape flow path 113 is structured to have the cross-sectional area gradually increasing toward the discharge port 115.

The upper casing 111 includes the suction port 114 opening in a shaft direction. This shaft is a shaft 151 of the impeller 120, and the shaft direction is the extending direction of the shaft 151. A motor 130 (see FIG. 2) for rotating the impeller 120 is attached to the lower casing 112 including a fixing leg 116 for attachment and fixing to another device and housing. Note that, in FIG. 1A, a collar made of metal is denoted by a reference sign 116a.

As illustrated in FIG. 2, the impeller 120 is fixed to the shaft 151 of the motor 130, and when the motor 130 rotates, the impeller 120 rotates. When the impeller 120 rotates, air is sucked in through the suction port 114 and guided to the inner side of the impeller 120 (inner space at the shaft center side). This air is blown out in the centrifugal direction from the inner side of the impeller 120 by the action of the vanes 121. The air blown out from the impeller 120 flows through the spiral shape flow path 113 toward the discharge port 115 in FIG. 1A, and is discharged from the discharge port 115.

The impeller 120 includes a cup-shaped hub 122 forming a top surface, the plurality of vanes 121 disposed at an annular portion at the outer side of the hub 122 in a state of being erected in the shaft direction, and an annular coupling ring 123 coupling end portions of the plurality of vanes 121 at the side opposite to the hub 122. All of the vanes 121, having the same shape, have a forward curved vane shape recessed with respect to the rotation direction of the impeller 120, and are uniformly arranged in the circumferential direction. The inner side space is provided at the inner side (shaft center side) of the plurality of vanes 121, and when the impeller 120 rotates, air is blown out in the centrifugal direction from the inner side space via the vanes 121.

As illustrated in FIG. 3, the hub 122 includes, at the center, a boss portion 124 protruding downward in a projecting form, and a through hole 124a is formed at the boss portion 124. A tubular bushing 125 made of metal (brass for example) is fixed to the inner circumference of the through hole 124a by insert molding, and the shaft 151 of the motor 130 is press-fitted into the bushing 125. Thus, the impeller 120 is coupled to the shaft 151. The shaft 151 is a rotation shaft of the motor 130 and also serves as a rotation shaft of the impeller 120 by being coupled to the impeller 120. The hub 122, the plurality of vanes 121, and the coupling ring 123 are integrally formed of resin.

2. Configuration of Motor

The motor 130 is an inner rotor type three-phase brushless motor and includes a cup-shaped housing 131 made of a magnetic metal material. A stator 140 is disposed at the inner circumferential surface of the housing 131. The stator 140 includes a stator core 141 formed by stacking a predetermined number of cores made of electromagnetic steel sheets, an insulator 142 mounted at the stator core 141, a coil 143 wound around the stator core 141 with the insulator 142 provided in between, and a circuit board 144 disposed above the insulator 142. The stator core 141 has a plurality of teeth extending inward in a radial direction from an annular core back portion, and the three-phase (U-phase, V-phase, and W-phase) coils 143 are wound around the teeth in star connection (Y connection) via the insulator 142.

A rotor 150 is disposed at the inner side of the stator core 141. The rotor 150 includes the shaft 151 made of metal, a cup-shaped rotor yoke 152 coupled to an upper end portion of the shaft 151, and a ring-shaped rotor magnet 153 fixed to an outer circumferential surface of the rotor yoke 152. At the center of the rotor yoke 152 made of a magnetic metal material, for example, a boss portion 152a is formed by a burring process, and the shaft 151 is press-fitted into the boss portion 152a. Thus, the shaft 151 and the rotor yoke 152 are coupled to each other.

A boss portion 131a is formed at the center of the housing 131, and a bearing holder 132 made of metal (brass for example) is press-fitted into the boss portion 131a. A pair of ball bearings 133 are mounted at the bearing holder 132, and the shaft 151 is rotatably supported by the pair of ball bearings 133. A compression coil spring 134 is interposed between the pair of ball bearings 133, and applies a preload to the ball bearings 133 by biasing the ball bearings 133 toward outer rings of the ball bearings 133.

Figure 4:
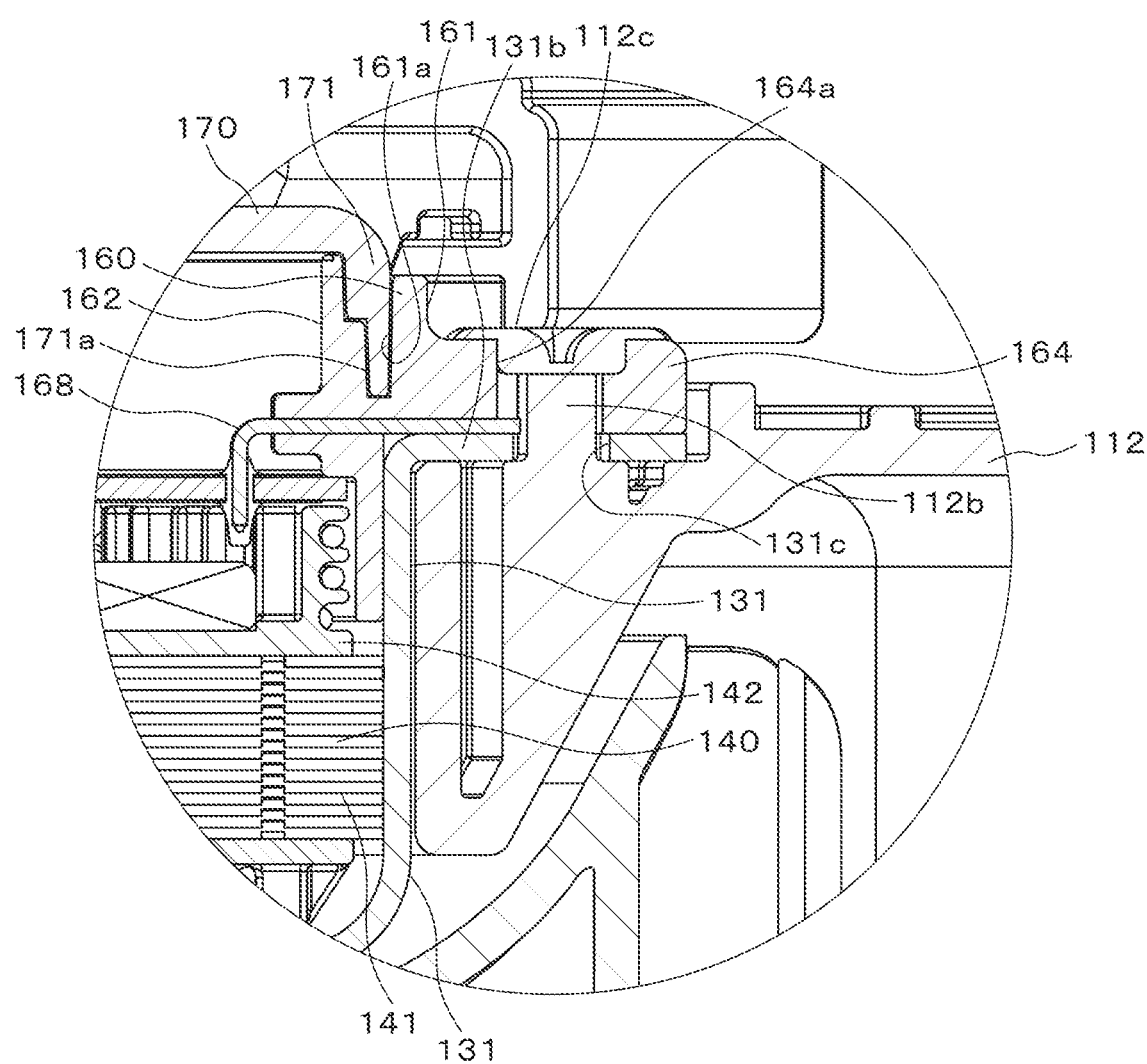
FIG. 4 is an enlarged view of a part indicated by an arrow IV in FIG. 3.

As illustrated in FIG. 4, a plurality of flange portions 131b extending outward in the radial direction are formed at an equal interval in the circumferential direction, at a circumference edge of an opening portion of the housing 131. In each flange portion 131b, a long through hole 131c is formed along the circumferential direction. The through hole 131c is used for joining with the lower casing 112 described below.

As illustrated in FIG. 3, the circuit board 144 carrying a circuit for driving and controlling the motor 130 is disposed at the upper side of the stator core 141 in the shaft direction. Terminals of the U phase, the V phase, and the W phase coils wound around the stator core 141 are inserted into through holes (not illustrated) connected to a wiring pattern formed at a mounting surface of the circuit board 144 and are connected using solder 145 (see FIG. 5).

The surface illustrated in FIG. 5 is the mounting surface of the circuit board 144. The other terminals of the U-phase, V-phase, and W-phase coils 143 are bundled, twisted, and connected using solder to be a common line coupling portion 143a (see FIGS. 7A and 7B). The common line coupling portion 143a is accommodated in a pocket portion (tubular portion) 163 formed at an end cap 160 disposed at the upper side of the housing 131 in the shaft direction.

3. Configuration of End Cap

Figure 7A:
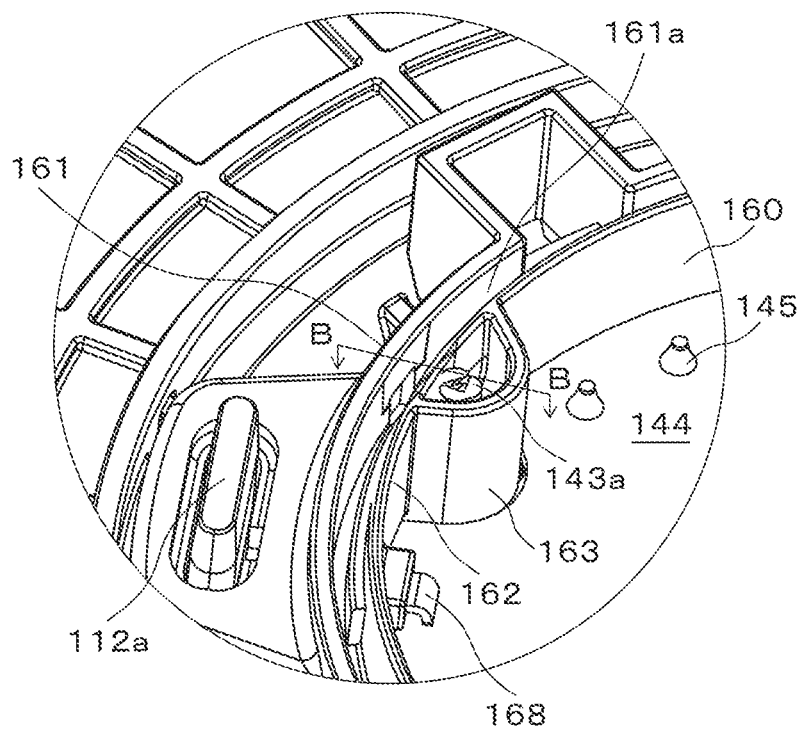
FIG. 7A is an enlarged view of a part indicated by an arrow VII in FIG. 5.
Figure 7B:
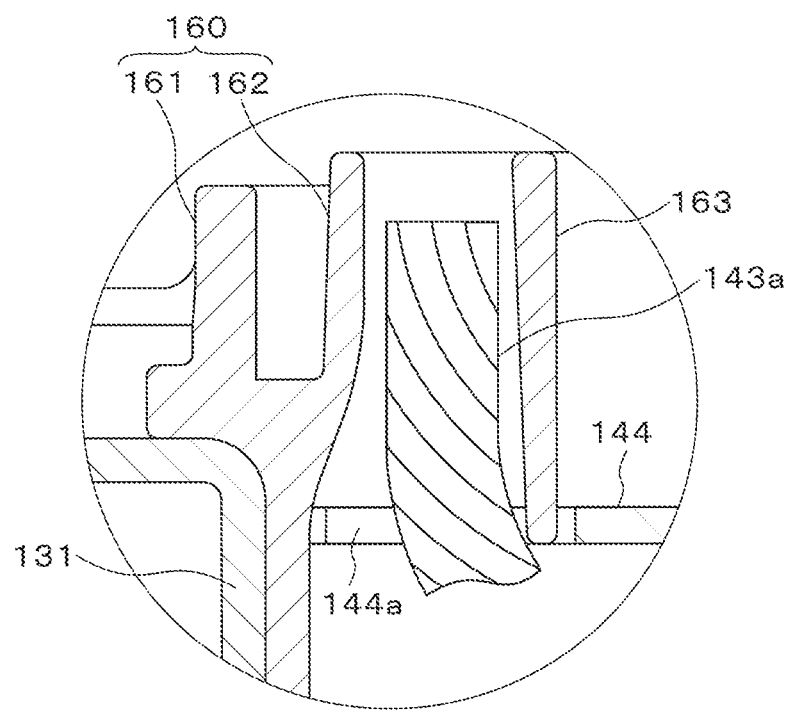
FIG. 7B is a cross-sectional view taken along line B-B in FIG. 7A.
Figure 8:
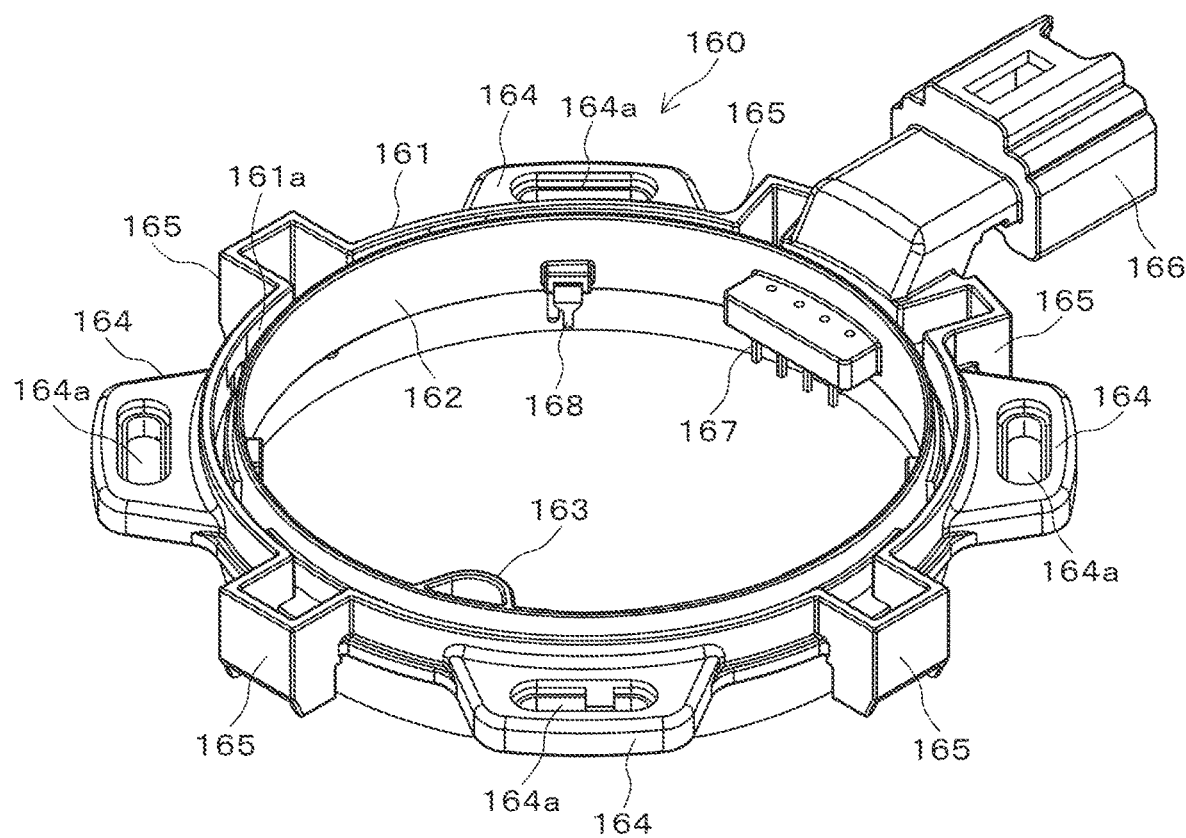
FIG. 8 is a perspective view of an end cap according to the embodiment.

The end cap 160 made of resin is mounted at the upper side of the housing 131 in the shaft direction. FIGS. 7A and 7B and FIG. 8 illustrate the end cap 160. The end cap 160 includes an outer annular portion 161 and an inner annular portion 162 disposed at the inner side of the outer annular portion 161 with a gap 161a provided in between. The pocket portion 163 is formed at the inner circumferential surface of the inner annular portion 162 to protrude inward in the radial direction.

Figure 9:
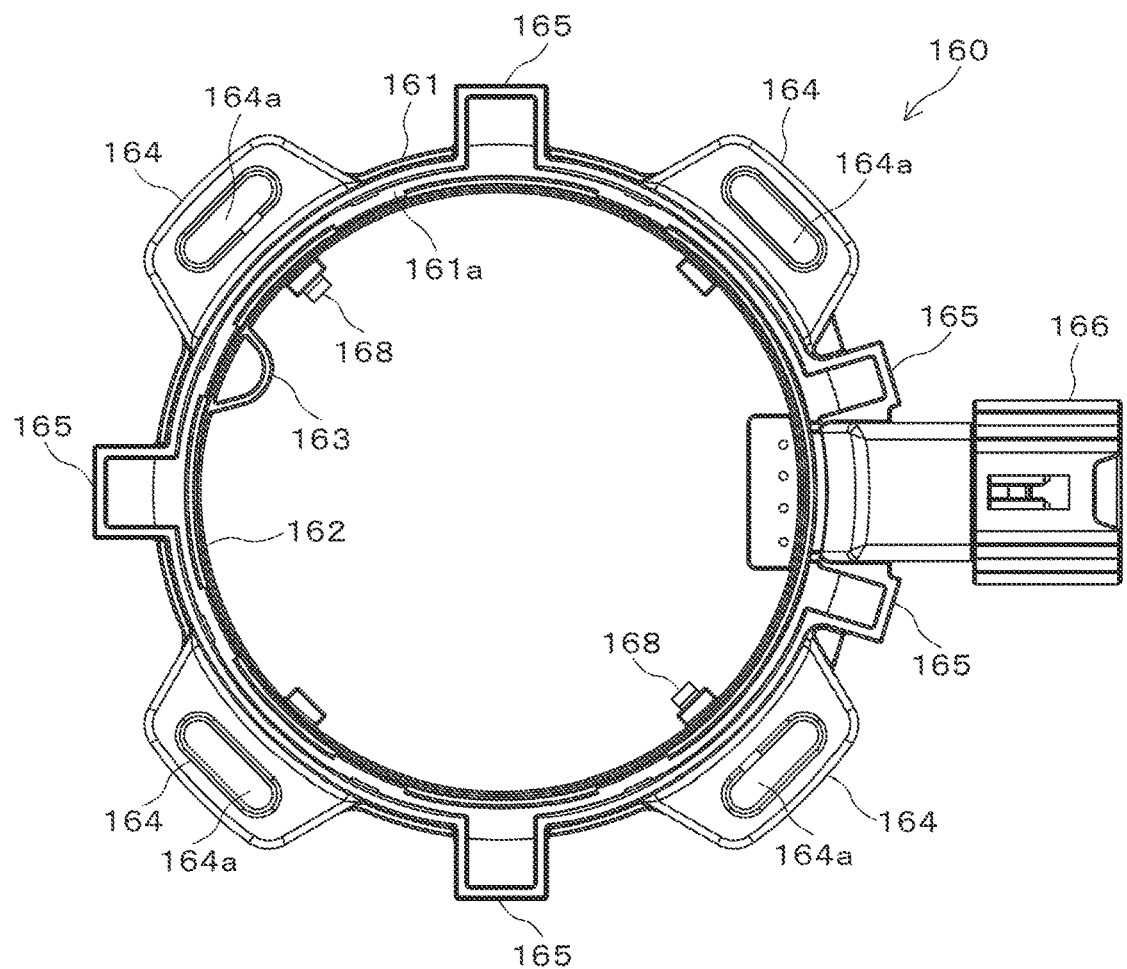
FIG. 9 is a back view of the end cap according to the embodiment.
Figure 10:
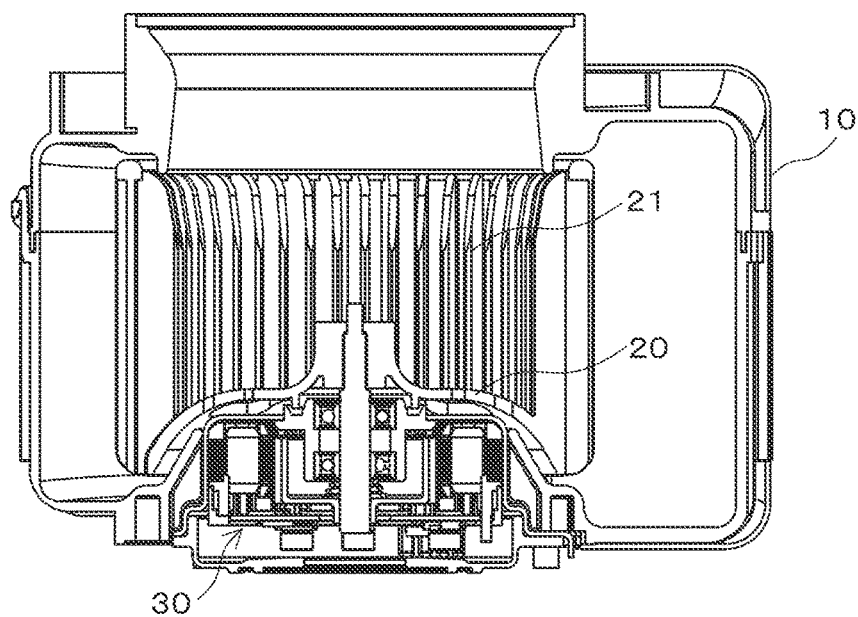
FIG. 10 is a cross-sectional view of a known centrifugal fan (JP 2020-016152 A).
Figure 11:
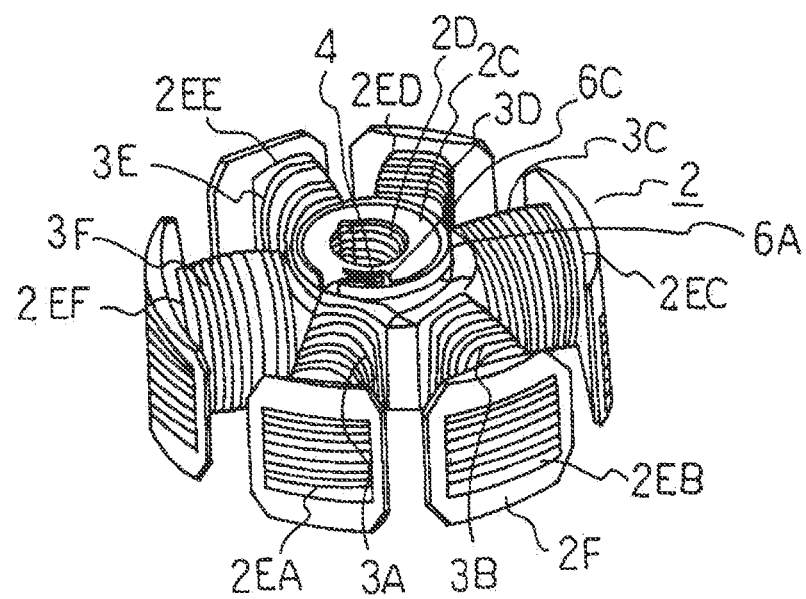
FIG. 11 is a perspective view illustrating a stator of a known brushless motor (JP H4-317534 A).
Figure 12:
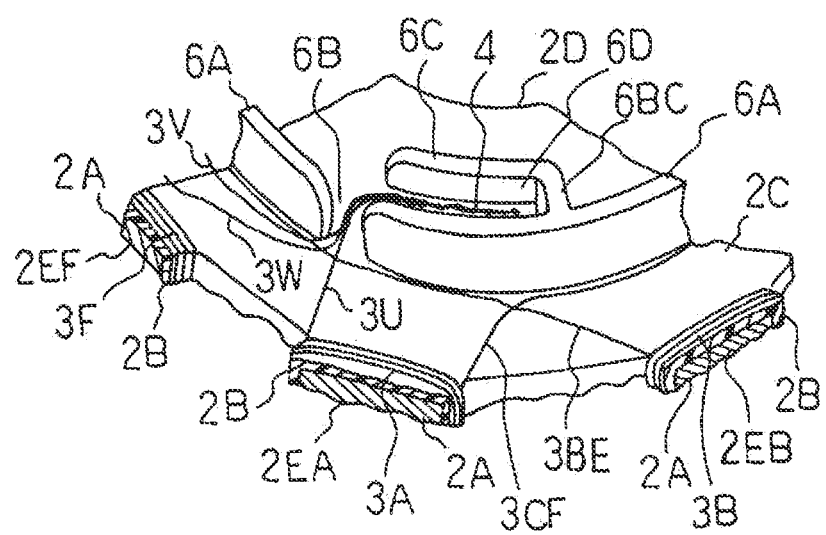
FIG. 12 is a perspective view of a main part in FIG. 11.

As illustrated in FIGS. 7A and 7B and FIG. 9, the pocket portion 163 has a tubular shape with a substantially semi-arcuate cross-sectional shape and with both ends open. FIG. 9 is a back view of the end cap 160. As illustrated in FIG. 7B, a substantially semi-circular notch 144a conforming to the shape of the pocket portion 163 is formed at the outer circumference edge of the circuit board 144, and a lower end portion of the pocket portion 163 is accommodated in the notch 144a. The common line coupling portion 143a of the coil of the respective phases protrudes from the notch 144a of the circuit board 144 in the shaft direction to be inserted into the pocket portion 163. The distal ends of the respective coil terminals are joined to each other using solder at the common line coupling portion 143a.

As illustrated in FIG. 8, at the outer circumferential surface of the outer annular portion 161 of the end cap 160, a plurality of (in this example, four) flange portions 164 protruding outward in the radial direction are formed at an equal interval in the circumferential direction. In the flange portions 164, long through holes 164a are formed along the circumferential direction. A plurality of (five in this example) frames (frame bodies) 165 are formed at the outer circumferential surface of the outer annular portion 161 of the end cap 160, to protrude outward in the radial direction. The frame 165 has a rectangular shape in plan view and is formed through in the shaft direction. The frame 165 is for attaching a cover 170 described below.

A connector housing 166 is integrally formed with the end cap 160. The connector housing 166 has a connector pin 167 integrally formed with the connector housing 166 by insert molding. The connector pin 167 has a crank shape, with one end portion passed through a through hole (not illustrated) formed at the circuit board 144 and joined to a non-mounting surface (the back surface of the circuit board 144 in FIG. 7A) using solder. The other end portion of the connector pin 167 protrudes into the inner space of the connector housing 166 and is connected to a socket inserted into the connector housing 166.

In the end cap 160, a plurality of (two in this example) connection terminals 168 are integrally formed with the end cap 160 by insert molding at the position of the flange portion 164. The connection terminal 168 has an L shape, with one end portion having a rectangular cross-sectional shape (see FIG. 8) passed through a through hole (not illustrated) formed at the circuit board 144 and joined to the non-mounting surface using solder. The through hole is connected to a GND pattern (solid pattern) formed at the circuit board 144.

As illustrated in FIG. 4, the other end portion of the connection terminals 168 is exposed at the lower surface of the flange portion 164 of the end cap 160, and is sandwiched between the lower surface of the flange portion 164 and the upper surface of the flange portion 131b of the housing 131. Thus, the GND pattern of the circuit board 144 is set to a reference potential (for example, 0 volts).

Now, an attachment structure of the end cap 160 will be described with reference to FIG. 4. As illustrated in FIG. 4, a boss portion 112b protruding upward in the drawing is formed at the lower casing 112. In the boss portion 112b, a through hole 131c is formed at the flange portion 131b of the housing 131 and a head portion 112c is formed to protrude upward through the through holes 164a formed at the flange portion 164 of the end cap 160, and has an upper end portion being thermally caulked and presses the flange portion 164. With this configuration, the end cap 160 is coupled to the lower casing 112.

The cover 170 made of resin is attached to the end cap 160 in order to prevent dust, foreign matter, and the like from entering the motor 130. The cover 170 has a substantially circular cup shape, with a circumference edge portion 171 extending in the shaft direction. An end portion of the circumference edge portion 171 is a tapered portion 171a with a thickness gradually decreasing downward.

The cover 170 is detachably attached to the end cap 160 with the tapered portion 171a pressed into the gap 161a between the outer annular portion 161 and the inner annular portion 162 of the end cap 160. A plurality of (five in this example) protrusions 172 protruding outward in the radial direction are formed at the outer circumferential surface of the circumference edge portion 171 of the cover 170 (see FIG. 1A). The protrusions 172 are fit with the frame 165 formed at the end cap 160 to prevent rotation of the cover 170.

4. Method for Assembling Centrifugal Blower i) Coupling Between Circuit Board and End Cap Rectangular lower end portions of the plurality of connector pins 167 illustrated in FIG. 8 are each inserted into the through hole from the mounting surface side of the circuit board 144, and the distal ends of the respective connector pins 167 protruding from the non-mounting surface of the circuit board 144 are connected using solder. Rectangular lower end portions of the connection terminals 168 are inserted into through holes formed at the circuit board 144 and connected to the GND pattern, and the distal ends of the connection terminals protruding from the non-mounting surface of the circuit board 144 are connected using solder. Thus, the end cap 160 and the circuit board 144 are coupled to each other.

ii) Coupling Between Motor and Circuit Board

The U-phase, the V-phase, and the W-phase terminals of the three-phase coils wound around the stator 140 of the motor 130 are bundled and twisted together to be the common line coupling portion 143a. The common line coupling portions 143a are joined to each other using solder and cut to a predetermined length. The common line coupling portion 143a thus joined using solder is bent and erected so as to be parallel to the shaft direction. The terminals of the coils of the respective phases are also bent and erected to be parallel to the shaft direction.

The U-phase, the V-phase, and the W-phase terminals are inserted into predetermined through holes from the non-mounting surface side of the circuit board 144, and the common line coupling portion 143a protrudes from the notch 144a formed at the outer circumference edge of the circuit board 144 toward the mounting surface side, to be accommodated in the pocket portion 163 formed at the inner circumferential surface of the end cap 160. The above operation is performed by bringing the end cap 160 coupled with the circuit board 144 and the housing 131 of the motor 130 close to each other. Then, the respective distal ends of the U phase, the V phase, and the W phase terminals protruding toward the mounting surface side are connected using the solder 145 (see FIG. 5 and FIG. 7A). As a result, the connection terminals 168 insert molded in the end cap 160 are brought into contact with the flange portions 131b of the housing 131 of the motor 130.

iii) Coupling Between Motor and Lower Casing

The motor 130 coupled with the end cap 160 and the circuit board 144 is inserted into an opening at the upper side of the lower casing 112 from above. At this time, the boss portion 112b formed around the opening of the lower casing 112 is inserted into the through hole 131c formed at the flange portion 131b of the housing 131 of the motor 130 and the through hole 164a formed at the flange portion 164 of the end cap 160.

Then, the distal end of the boss portion 112b protruding from the through hole 164a of the flange portion 164 of the end cap 160 is heated to be expanded and plastically deformed to form the head portion 112c. With the head portion 112c thus formed, the connection terminals 168 are held between the end cap 160 and the flange portions 131b of the housing 131 of the motor 130, and are in close contact with the flange portions 131b of the housing 131 of the motor 130.

iv) Coupling of Impeller to Motor

The impeller 120 is inserted into an opening at the lower side of the lower casing 112, and the lower end portion of the shaft 151 is press-fitted into a block 125 of the impeller 120.

V) Additional

The cover 170 is attached to the end cap 160 with the tapered portion 171a of the circumference edge portion 171 of the cover 170 press-fitted into the gap 161a between the outer annular portion 161 and the inner annular portion 162 of the end cap 160. The upper casing 111 and the lower casing 112 are coupled, with the claw portions 112a of the lower casing 112 inserted and engaged in the engaging portion 111a of the upper casing 111.

5. Effect

According to the centrifugal blower 100 having the above-described configuration, the common line coupling portion 143a protrudes upward in the shaft direction from the circuit board 144 to be accommodated in the pocket portion 163 of the end cap 160. Thus, it is a matter of course that the common line coupling portion 143a needs not to be covered with a tube. Furthermore, the common line coupling portion 143a can be insulated from other members only by inserting the common line coupling portion 143a into the pocket portion 163, thereby improving workability. Therefore, the common line coupling portion 143a can be easily insulated from other members. Since the periphery of the common line coupling portion 143a is surrounded by the pocket portion 163, the insulated state can be reliably maintained.

In particular, in the above-described embodiment, since the pocket portion 163 extends in the shaft direction, the common line coupling portion 143a can be extended in the shaft direction without being bent, and the common line coupling portion 143a can be moved in the shaft direction relative to the pocket portion 163 and inserted into the pocket portion 163, thereby further improving workability.

6. Modification Examples

The disclosure is not limited to the embodiment described above, and various modifications are possible as described below.

i) A boss portion protruding downward may be formed at the flange portion 164 of the end cap 160, the boss portion may be inserted into the through hole 131c formed at the flange portions 131b of the housing 131 of the motor 130, and the distal end of the boss portion protruding from the through hole 131c may be heated and plastically deformed to be caulked and fixed.

ii) The flange portion 131b of the housing 131 can be press-fitted to the inner circumferential surface of the end cap 160.

iii) The pocket portion 163 may be inclined or orthogonal to the shaft direction.

iv) The upper end opening of the pocket portion 163 can be closed with a lid.

INDUSTRIAL APPLICABILITY

The disclosure is applicable to a centrifugal blower used for air blowing, ventilation, cooling, and the like in household electrical appliances, office automation equipment, and air conditioning apparatuses for industrial use and vehicles.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A centrifugal blower comprising, at an inner side of a casing:
an impeller;
a motor configured to rotate the impeller, and
a circuit board carrying a circuit configured to drive and control the motor, the impeller, the motor, and the circuit board being accommodated in the casing, wherein
the motor is disposed at a first end portion side of the circuit board in a shaft direction, and an end cap is provided at a second end portion side of the circuit board in the shaft direction,
the end cap includes an annular portion extending in the shaft direction and a tubular portion protruding inward in a radial direction from an inner circumferential surface of the annular portion, the motor is a three-phase brushless motor including a stator, and includes a common line coupling portion with three-phase coils wound around the stator in star connection, wherein the common line coupling portion is formed by bundling distal ends of the respective coil to each other, and the common line coupling portion protrudes toward the second end portion side in the shaft direction from the circuit board, and is accommodated in the tubular portion of the end cap, wherein the circuit board includes a notch, the common line coupling portion protrudes into the tubular portion through the notch. and an end portion of the tubular portion at the first end portion side in the shaft direction is accommodated in the notch.

2. The centrifugal blower according to claim 1, wherein the tubular portion extends in the shaft direction, and the common line coupling portion extends in the shaft direction and is accommodated in the tubular portion.

3. The centrifugal blower according to claim 1, wherein the casing includes an upper casing and a lower casing, and the end cap is attached to the lower casing.

4. The centrifugal blower according to claim 1, wherein the annular portion of the end cap includes an outer annular portion and an inner annular portion provided at an inner side of the outer annular portion with a gap provided in between, and the tubular portion is provided at the inner annular portion.

5. The centrifugal blower according to claim 4, wherein the outer annular portion includes a plurality of flange portions protruding outward in the radial direction, the flange portions include a through hole, the lower casing includes a boss portion protruding toward the second end portion side in the shaft direction, and the boss portion protrudes from the through hole and is fixed to an edge portion of the through hole by caulking.

6. The centrifugal blower according to claim 4, wherein a cover closing an inner side of the annular portion is attached to the end cap, the outer annular portion includes a plurality of frame bodies protruding outward in the radial direction, and the cover includes a protrusion protruding outward in the radial direction and is fitted with the frame bodies.

7. The centrifugal blower according to claim 6, wherein a circumference edge portion of the cover protrudes toward the first end portion side in the shaft direction, the circumference edge portion is a tapered portion with a thickness gradually decreasing toward the first end portion side in the shaft direction, and the cover is detachably attached to the end cap with the tapered portion inserted in the gap.

8. The centrifugal blower according to claim 1, wherein the common line coupling portion is formed by bundling and twisting distal ends of the U-phase, V-phase, and W-phase coils.

* * * * *